US010717907B2

(12) United States Patent
Wang et al.

(10) Patent No.: US 10,717,907 B2
(45) Date of Patent: Jul. 21, 2020

(54) PHOTO-CURABLE ADHESIVE COMPOSITION, PREPARATION AND USE THEREOF

(71) Applicant: Henkel AG & Co. KGaA, Duesseldorf (DE)

(72) Inventors: Hongyu Wang, Shanghai (CN); Chunfu Chen, Yok (CN); Daoqiang Lu, Chandler, AZ (US); Minrui Li, Shanghai (CN); Yinxiao Yuan, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/598,864

(22) Filed: May 18, 2017

(65) Prior Publication Data

US 2017/0253780 A1    Sep. 7, 2017

Related U.S. Application Data

(63) Continuation of application No. PCT/CN2014/091369, filed on Nov. 18, 2014.

(51) Int. Cl.

| | | |
|---|---|---|
| *C09J 175/16* | (2006.01) | |
| *B32B 7/12* | (2006.01) | |
| *B32B 27/08* | (2006.01) | |
| *B32B 17/10* | (2006.01) | |
| *C09D 4/06* | (2006.01) | |
| *C08F 290/06* | (2006.01) | |
| *B32B 37/12* | (2006.01) | |
| *C09J 5/00* | (2006.01) | |
| *C09J 11/04* | (2006.01) | |
| *C09J 11/06* | (2006.01) | |

(52) U.S. Cl.
CPC ............... *C09J 175/16* (2013.01); *B32B 7/12* (2013.01); *B32B 17/10706* (2013.01); *B32B 17/10743* (2013.01); *B32B 27/08* (2013.01); *B32B 37/12* (2013.01); *C08F 290/067* (2013.01); *C09D 4/06* (2013.01); *C09J 5/00* (2013.01); *C09J 11/04* (2013.01); *C09J 11/06* (2013.01); *B32B 2307/41* (2013.01); *B32B 2307/412* (2013.01); *B32B 2405/00* (2013.01); *B32B 2457/20* (2013.01); *C09J 2433/00* (2013.01); *C09J 2475/00* (2013.01)

(58) Field of Classification Search
CPC ...................................... C09J 175/16
See application file for complete search history.

(56) References Cited

U.S. PATENT DOCUMENTS

| | | | |
|---|---|---|---|
| 33,661 A | 11/1861 | Parkhurst | |
| 43,965 A | 8/1864 | Avery | |
| 6,455,121 B1 | 9/2002 | Ha et al. | |
| 7,691,437 B2 | 4/2010 | Ellis et al. | |
| 9,314,815 B2 | 4/2016 | Soelch et al. | |
| 2011/0201717 A1* | 8/2011 | Held | C09J 4/00 522/33 |
| 2012/0253061 A1 | 10/2012 | Takahashi | |
| 2013/0011683 A1 | 1/2013 | Busman et al. | |
| 2013/0288052 A1* | 10/2013 | Tapio | C09K 3/149 428/355 CN |
| 2013/0295337 A1* | 11/2013 | Busman | G02F 1/1303 428/174 |

FOREIGN PATENT DOCUMENTS

| | | |
|---|---|---|
| CN | 101649171 | 2/2010 |
| CN | 101838505 | 9/2010 |
| CN | 102321437 | 1/2012 |
| CN | 102388324 | 3/2012 |
| CN | 102736257 | 10/2012 |
| JP | 2001-098226 | 4/2001 |
| JP | 2003105320 | 4/2003 |
| JP | 2005241977 | 9/2005 |
| JP | 2007510035 | 4/2007 |
| JP | 2009-001654 | 1/2009 |
| JP | 2013156506 | 8/2013 |
| JP | 2014516098 | 7/2014 |
| JP | 2014181330 | 9/2014 |
| WO | 2009086491 | 7/2009 |
| WO | 2009086492 | 7/2009 |
| WO | 2011119828 | 9/2011 |

(Continued)

OTHER PUBLICATIONS

DyStar. Foam Blast 20F Translucent liquid. Evidentiary reference. Available online at https://www.dystar.com/industrial-foam-control-agents-silicone-compound/foam-blast-20f/. (Year: 2018).*

(Continued)

*Primary Examiner* — Michael M Dollinger
(74) *Attorney, Agent, or Firm* — Steven C. Bauman

(57) ABSTRACT

The present invention provides a photo-curable adhesive composition for display panel assembly comprising a) at least one polyurethane acrylate having Tg value from −70 to 20° C.; b) at least one (meth)acrylate monomer; c) at least one chain transfer agent; d) at least two thixotropy agents, wherein first thixotropy agent is selected from the group consisting of hydrophobic fumed silica, hydrophilic fumed silica and mixtures thereof and second thixotropy agent is selected from the group consisting of modified urea, polyhydroxycarboxylic acid esters and mixtures thereof; e) at least one photoinitiator; f) at least one plasticizer; and g) at least one defoamer. The photo-curable adhesive composition according to the present invention can be used in bonding two transparent substrates together or in bonding one transparent substrate and one opaque substrate together. Furthermore, the composition according to the present invention can be used in a process of making an optical assembly.

16 Claims, No Drawings

(56) References Cited

FOREIGN PATENT DOCUMENTS

| WO | 2012036980 | 3/2012 |
|----|-----------|--------|
| WO | 201303568 | 1/2013 |
| WO | 2013013598 | 1/2013 |
| WO | 2013049133 | 4/2013 |
| WO | 2013077812 | 5/2013 |
| WO | 2013173976 | 11/2013 |
| WO | 2013173977 | 11/2013 |
| WO | 2014029062 | 2/2014 |
| WO | 2014046182 | 3/2014 |

OTHER PUBLICATIONS

International Search Report issued in connection with International Patent Application No. PCT/CN2014/091369 dated Aug. 13, 2015.

\* cited by examiner

PHOTO-CURABLE ADHESIVE COMPOSITION, PREPARATION AND USE THEREOF

FIELD OF THE INVENTION

The present invention relates to a photo-curable adhesive composition for display panel assembly, its preparation and use thereof.

BACKGROUND ART

Optically clear adhesive is used to bond optical elements such as display panels, glass plates, touch panels, diffusers, rigid compensators, heaters, and flexible films like polarizers and retarders. Control of the adhesive flow is very critical in the bonding process. "Overflow" of an adhesive will occur when the adhesive flows out the intended coverage area. Subsequently, the cured adhesive will cause mechanical fitting problems in the assembly process. Furthermore, overflow of the adhesive will contaminate adjacent components in the display assembly. As a result, additional cleaning step will be required before curing, which will increase the cycle time of the manufacturing process.

A method called "damming process" is an attempt to solve this problem. This process consists of two steps. In the first step, the adhesive is applied to the edge of the required area by a dispensing nozzle and cured to form a so-called "dam". In the second step, optically clear adhesive is filled into the area inside the dam. The "damming process" is not satisfying because it requires two steps of dispensing. Furthermore, the boundary of the dam is not easy to control.

Another attempt to solve this problem is to use optically clear tapes, but it needs a special knife to cut off tapes with tailored size to match the display panel, and furthermore, it leads to a lower brightness and contrast degree of the display due to air gaps or bubbles in assembly of display panel in large size.

Therefore, methods called "stencil printing process" and "slit coating process" have been created to solve this problem. "Stencil printing" is a process by which a viscous material is deposited through the aperture openings of a stencil onto a substrate. For the printing process the stencil is aligned to the substrate and then brought in close or in direct contact with the surface of the substrate. An angled blade, called a squeegee, is used to drive the material across the surface of the stencil at a controlled speed and force. "Slit coating" is employed to dispose adhesives accurately and quickly in precision lamination applications involving the lamination of a glass panel onto a display panel in LCD display, or the lamination of a touch sensitive panel onto a display panel in touch-sensitive electronic devices.

Stencil print process and slit coating process, require adhesives having side curing capability, stable thixotropy and low dielectric constant, which are still challenges in the field of optically clear adhesives.

Therefore, there is a need for optically clear adhesive providing improved side curing capability, stable thixotropy and low dielectric constant.

SUMMARY OF THE INVENTION

The present invention provides a photo-curable adhesive composition for display panel assembly comprising a) at least one polyurethane acrylate having Tg value from −70 to 20° C.; b) at least one (meth)acrylate monomer; c) at least one chain transfer agent; d) at least two thixotropy agents, wherein first thixotropy agent is selected from the group consisting of hydrophobic fumed silica, hydrophilic fumed silica and mixtures thereof and second thixotropy agent is selected from the group consisting of modified urea, polyhydroxycarboxylic acid esters and mixtures thereof; e) at least one photoinitiator; f) at least one plasticizer; and g) at least one defoamer.

In another aspect, the present invention relates to a process to prepare a photo-curable adhesive composition according to the present invention, comprising steps of: (i) preparing first pre-mix comprising a (meth)acrylate monomer, a photoinitiator, a chain transfer agent, first thixotropy agent, second thixotropy agent and a defoamer, and grinding the pre-mixture to particles having average particle diameter between 5 to 10 µm; (ii) preparing second pre-mix comprising a polyurethane acrylate and plasticizer; (iii) combining first pre-mix and second pre-mix and mixing with shear blade.

In further aspect the present invention relates to use of a photo-curable adhesive composition according to the present invention in bonding two transparent substrates together or in bonding one transparent substrate and one opaque substrate together.

In still further aspect the present invention relates to a process of making an optical assembly comprising steps of bonding two transparent substrates together or bonding one transparent substrate and one opaque substrate together using a photo-curable adhesive composition according to the present invention.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

By the term "photo-curable adhesive" is meant herein an adhesive which is cured via exposure to UV light with wavelength from 200 to 400 nm.

The present invention relates to a photo-curable adhesive composition for a display panel assembly comprising a) at least one polyurethane acrylate having Tg value from −70 to 20° C.; b) at least one (meth)acrylate monomer; c) at least one chain transfer agent; d) at least two thixotropy agents, wherein first thixotropy agent is selected from the group consisting of hydrophobic fumed silica, hydrophilic fumed silica and mixtures thereof and second thixotropy agent is selected from the group consisting of modified urea, polyhydroxycarboxylic acid esters and mixtures thereof; e) at least one photoinitiator; f) at least one plasticizer; and g) at least one defoamer.

Each component of the adhesive composition of the present invention will be described as follows.

Polyurethane Acrylate

A photo-curable adhesive composition according present invention comprises at least one polyurethane acrylate (a).

Urethane acrylates are well known to the person skilled in the art, and they may for example be obtained by reaction of diisocyanates, preferably aliphatic diisocyanates, with hydroxyacrylates. Or may for example be obtained by reaction of diisocyanates, preferably aliphatic diisocyanates, hydroxyacrylates and polyols. Preferably, the polyurethane acrylate used in the composition according to the present invention is aliphatic polyether urethane or acrylic ester. Preferably, the urethane acrylate used in the composition according to the present invention comprises multifunctional urethane (meth)acrylate oligomer. The urethane (meth)acrylate oligomer preferably comprises at least one (meth)acrylate group i.e. from 1 to 4 (meth)acrylate groups. Preferred urethane acrylates are multifunctional and in particular difunctional aliphatic urethane acrylate oligomers are preferred.

For example, the multifunctional urethane acrylate oligomer may be formed from an aliphatic polyester or polyether polyol prepared from condensation of a dicarboxylic acid e.g. adipic acid or maleic acid, and an aliphatic diol e.g. diethylene glycol or 1,6-hexanediol. In one embodiment, the polyester polyol may comprise adipic acid and diethylene glycol. The multifunctional isocyanate may comprise methylene dicyclohexylisocyanate or 1,6-hexamethylene diisocyanate. The hydroxyl-functionalized acrylate may comprise a hydroxyalkyl acrylate such as 2-hydroxyethyl acrylate, 2-hydroxypropyl acrylate, 4-hydroxybutyl acrylate, or polyethylene glycol acrylate. In one embodiment, the multifunctional urethane acrylate oligomer may comprise the reaction product of a polyester polyol, methylene dicyclohexyldiisocyanate and hydroxyethyl acrylate.

Suitable urethane acrylates, which may be used in the compositions according to the present invention, are for example aliphatic polyether urethane diacrylates, in particular BR-3042, BR-3641 AA, BR-3741 AB and BR-344 from Bomar Specialties Co., Torrington, C T. Other preferred aliphatic urethane acrylates are for example CN8004, CN-9002, CN-980, CN-981, CN-9014, CN-9019, CN9021 from Sartomer Company Inc, Exton, Pa. Urethane acrylate resins such as Genomer 4188/EHA, Genomer 4269/M22, Genomer 4425, and Genomer 1122, Genomer 6043 from Rahn AG, Switzerland are preferred. Urethane acrylate oligomers are also preferred for example UV-3000B, UV-36301D80, UV-004, UV-NS054, UV-7000B and UV-NS077 from Nippon Gohsei, Japan as well as UC-203, UC-102 from Kuraray Company. Aliphatic urethane acrylate oligomers like Doublemer 5500 from Double Bond Chemical Ind., Co. Ltd are also preferred. Difunctional aliphatic polyester urethane acrylate oligomer as well as difunctional aliphatic polyester/ether urethane acrylate oligomer are also preferred urethane acrylates.

Suitable polyurethane acrylate to be used in the present invention has Tg value from −70 to 20° C., preferably from −50 to 10° C.

The polyurethane acrylate having Tg value higher than 20° C. tends to crystalize, and therefore, loose its liquidity. In addition, the composition comprising polyurethane acrylate having Tg higher than 20° C. tends to be too hard after curing, which may cause Mura appearance.

By the term "Mura issue" or "Mura appearance" is meant herein the defect on the display panel such as delamination, yellow spot, ripple etc.

A photo-curable adhesive composition according present invention comprises a polyurethane acrylate from 10% to 90% by weight of the total weight of the composition, preferably from 20% to 70%, more preferably from 40% to 70%.

When the quantity of polyurethane acrylate is less than 10% by weight of the total weight of the composition, the composition tends to have high shrink ratio, which leads to sample crack. While the quantity of polyurethane acrylate is higher than 90% by weight of the total weight of the composition, the composition tends to have very high hardness after curing and the viscosity of the adhesive is too high to roll out.

(Meth)acrylate Monomer

A photo-curable adhesive composition according present invention comprises at least one a (meth)acrylate monomer (b). Suitable (meth)acrylate monomer is mono-functional or di-functional (meth)acrylate monomer.

Preferably, (meth)acrylate monomer is selected from the group consisting of methyl (Meth)acrylate, ethyl (meth)acrylate, butyl (meth)acrylate, 2-(2-ethoxyethoxy) ethyl acrylate, tetrahydrofurfuryl (meth)acrylate, lauryl actylate, isooctyl acrylate, n-octyl acrylate, isodecyl acrylate, n-decyl acrylate, isobornyl acrylate, 2-phenoxythyl acrylate, 2-hydroxyethyl (meth)acrylate, 2-hydroxypropyl (meth)acrylate, 2(or 4)-hydroxybutyl (meth)acrylate, morpholine, 4-acryloyl-, caprolactone acrylate, morpholine (meth)acrylate, hexanediol di(meth)acrylate, ethyleneglycol di(meth)acrylate and mixtures thereof.

More preferably, (meth)acrylate monomer is selected from the group consisting of lauryl actylate, isooctyl acrylate, n-octyl acrylate, isodecyl acrylate, n-decyl acrylate, isobornyl acrylate, 2-hydroxyethyl (meth)acrylate, 2-hydroxypropyl (meth)acrylate, 2-hydroxybutyl (meth)acrylate, 4-hydroxybutyl (meth)acrylate, morpholine, 4-acryloyl- and mixtures thereof.

A photo-curable adhesive composition according present invention comprises a (meth)acrylate monomer from 5% to 40% by weight of the total weight of the composition, preferably from 10% to 30%.

When the quantity of (meth)acrylate monomer is less than 5% by weight of the total weight of the composition, the composition tends to have higher viscosity with shearing, which might cause difficulty in dispensing composition during lamination procedure. While the quantity of (meth)acrylate monomers is higher than 40% by weight of the total weight of the composition, the composition tends to have higher shrinkage, which leads to Mura issue for panel assembly.

Chain Transfer Agent

A photo-curable adhesive composition according present invention comprises at least one a chain transfer agent (c).

By the term "chain transfer" is meant herein a polymerization reaction, in which the activity of a growing polymer chain is transferred to another molecule. The chain transfer reactions reduce the amount of comparably longer and shorter molecular chains and therefore molecular weight distribution is narrowed. Because the number of molecular with higher molecular weight is decreased, the resultant composition has an ideal hardness after curing.

Chain transfer can be introduced deliberately into a polymerization reaction by use of a chain transfer agent. Suitable chain transfer agent to be used in the present invention is thiol. Preferably, thiol is selected from the group consisting of n-octyl mercaptan, n-dodecyl mercaptan, tert-dodecyl mercaptan, methyl mercaptan, ethyl mercaptan, tert-butyl mercaptan, benzyl mercaptan, tert-nonyl mercaptan, thioglycolic, iso-octyl thioglycolate, 2-ethylhexyl thioglycolate, 1,8-dimercapto-3,5- dioxaoctane, dibenzylthithiocarbonate, β-mercaptopropionic, methyl-3-mercaptopropionate, 2-ethylhexyl-3-mercaptopropionate, n-octyl-3-mercaptopropioate, methoxybuthyl-3-mercaptopropionate, stearyl-3-mercaptopropionate, 1,8-dimercapto-3,6-dioxaoctane, trimethylolpropane tris-3-mercaptopropionate, tris-[(3-mercaptopropionyloxy)-ethyl]-isocyanurate, pentaerythritol tetrakis-3-mercaptopropionate, pentaerythritol tetra(3-mercaptopropionate), tetraethyleneglycol bis(3-mercaptopropionate), dipentaerythritol hexa-3-mercaptopropionate and mixtures thereof.

Preferably, thiol is selected from the group consisting of n-octyl mercaptan, n-dodecyl mercaptan, 1,8-dimercapto-3,6-dioxaoctane, pentaerythritol tetra(3-mercaptopropionate) and mixtures thereof.

A photo-curable adhesive composition according present invention comprises a chain transfer agent from 0.02% to 5% by weight of the total weight of the composition, preferably from 0.1% to 3%.

When the quantity of a chain transfer agent is less than 0.02% by weight of the total weight of the composition, the composition tends to have higher hardness, and therefore lack of sufficient toughness, which may cause Mura issue. While the quantity of a chain transfer agent is higher than 5% by weight of the total weight of the composition, the composition tends to be too soft, and therefore lack of sufficient cohesive strength.

Thixotropy Agent

A photo-curable adhesive composition according present invention comprises at least two thixotrophy agents (d).

By the term "thixotropy agent" is meant herein an agent which is able adjust the thixotropy property of the material in the stage between liquid and solid state according to hydromechanics.

According to the present invention, two kinds of thixotropy agents are required. The first thixotropy agent is used to form thixotropic nets in the composition. When hydrophilic thixotropy agent is used, the thixotropic nets are formed by hydrogen bonds between the polymer chains and thixotropy agent. When hydrophobic thixotropy agent is used, besides the hydrogen bonds, the thixotropic nets are also formed by the interaction of organic groups surrounding the hydrophobic thixotropy agent and the polymer chains.

When the first thixotropy agent is used alone, during storage of the composition, the thixotropy property is attenuated with lapse of time. Main reason for this is that the first thixotropy agent is not stable enough for prolonged period of time. And in addition it easyly aggregates and separates out from the composition.

To solve this problem, the second thixotropy agent is added into the composition. The second thixotropy agent connects to both the first thixotropy agent and polymer chains to stabilize the first thixotropy agent.

The first thixotropy agent is selected from the group consisting of hydrophobic fumed silica, hydrophilic fumed silica and mixtures thereof.

More preferably, the first thixotropy agent is selected from the group consisting of hydroxy modified fumed silica, methacryloxypropyltrimethoxysilane modified fumed silica and mixtures thereof.

The second thixotropy agent is selected from the group consisting of modified urea, polyhydroxycarboxylic acid esters and mixtures thereof.

A photo-curable adhesive composition according present invention comprises the first thixotropy agent from 0.01% to 10% by weight of the total weight of the composition, preferably from 1% to 7%.

When the quantity of the first thixotropy agent is less than 0.01% by weight of the total weight of the composition, the composition tends to be Newton liquid and is not suitable for use in lamination procedure in stencil printing or slit coating processes. By the term "Newton liquid" is meant herein the liquid having constant viscosity under different shearing rate. While the quantity of the first thixotropy agent is higher than 10% by weight of the total weight of the composition, the composition tends to have higher thixotropic index, which may cause difficulties in preparation of the composition, and further dispense of the composition in the lamination procedure.

By the term "thixotropic index" is meant herein the viscosity ratio at the shearing rate of $1\ s^{-1}$ and $10\ s^{-1}$.

A photo-curable adhesive composition according present invention comprises the second thixotropy agent from 0.01% to 5% by weight of the total weight of the composition, preferably from 0.01% to 3%.

When the quantity of the second thixotropy agent is less than 0.01% by weight of the total weight of the composition, the composition tends to have difficulty to achieve certain thixotropic index, which would meet the requirement in stencil printing and slit coating processes. While the quantity of the second thixotropy agent is higher than 5% by weight of the total weight of the composition, the composition tends to have clarity problems, such as yellowish colour and haze.

To apply the adhesive onto the substrate, the adhesive will be dispensed by stencil printing or slit coating process. By adding the first and second thixotropy agents, the adhesive keeps flowing under high shear stress and restores its original shape immediately after the external shear stress is removed.

Photoinitiator

A photo-curable adhesive composition according present invention comprises at least one photoinitiator (e).

By the term "photoinitiator" is meant herein a chemical compound that decomposes into free radicals when exposed to UV light, and subsequently initiates the UV-curing reaction.

Suitable photoinitiator for use in the present invention is preferably selected from the group consisting of 1-hydroxy cyclohexyl phenyl ketone, 2-methyl-1-[4-(methylthio)phenyl]-2-morpholino propan-1-one, 2-benzyl-1-N,N-dimethylamino-1-(4-morpholinophenyl)-1-butanone, combination of 1-hydroxy cyclohexyl phenyl ketone and benzophenone, 2,2-dimethoxy-2-phenyl acetophenone, combination of bis (2,6-dimethoxybenzoyl-2,4,6-trimethylpentyl) phosphine oxide and 2-hydroxyl-2-methyl-1-phenyl-propan-1-one, bis (2,4,6-trimethyl benzoyl) phenyl phosphine oxide, 2-hydroxy-2-methyl-1-phenyl-1-propane, combination of 2,4,6-trimethylbenzoyl diphenyl phosphine oxide and 2-hydroxy-2-methyl-1-phenyl-propan-1-one, 2,4,6-trimethylbenzoyldiphenylphosphine oxide and mixtures thereof.

More preferably, the photoinitiator is selected from the group consisting of 1-hydroxy cyclohexyl phenyl ketone, 2,4,6-trimethylbenzoyldiphenylphosphine oxide, bis(2,4,6-trimethyl benzoyl) phenyl phosphine oxide and mixtures thereof.

A photo-curable adhesive composition according present invention comprises the photoinitiator from 0.02% to 5% by weight of the total weight of the composition, preferably from 0.1% to 3%.

When the quantity of the photoinitiator is less than 0.02% by weight of the total weight of the composition, the composition tends to have difficulty to be cured by UV. While the quantity of the photoinitiator is higher than 5% by weight of the total weight of the composition, the composition tends to be fast cured, and the release heat will bring negative effect to the assembled panel. Moreover, a high content of photoinitiator might lead to low molecule weight, which will result in the low cohesive strength of the cured products.

Plasticizer

A photo-curable adhesive composition according present invention comprises at least one plasticizer (f).

Preferably, plasticizer used in the present invention is selected from the group consisting of polyisoprene resin, polybutadiene resin, hydrogenated polybutadiene, xylene polymer, hydroxyl-terminated polybutadiene and/or hydroxyl-terminated polyolefin, triethylene glycol bis-(2-ethylhexanoate), dibutoxyethoxyethyl adipate and mixtures thereof.

More preferably, plasticizer is selected from the group consisting of hydroxyl-terminated polybutadiene and/or hydroxyl-terminated polyolefin, triethylene glycol bis-(2-ethylhexanoate), dibutoxyethoxyethyl adipate and mixtures thereof.

Use of the plasticizer leads to the reduced shrinkage of the composition, which reduces the Mura appearance. Moreover, plasticizer is able to adjust the yield stress in dispensing composition having a high thixotropic index, which on the other hand may decrease the probability of defect in the assembled panel.

By the term "yield stress" is meant herein the shearing stress that makes the material to be transformed from elasticity to viscoelasticity.

A photo-curable adhesive composition according present invention comprises the plasticizer from 0.1% to 80% by weight of the total weight of the composition, preferably from 4% to 60%.

When the quantity of the plasticizer is less than 0.1% by weight of the total weight of the composition the composition tends to have higher shrinkage, which leads to Mura issue and results in higher yield stress. While the quantity of the plasticizer is higher than 80% by weight of the total weight of the composition, the composition tends to have lower cohesive and bonding strength after curing.

Defoamer

A photo-curable adhesive composition according present invention comprises at least one defoamer (g).

Preferably, defoamer used in the present invention is selected from the group consisting of silicone defoamer, polyether defoamer and mineral oil defoamer and mixtures thereof.

More preferably, defoamer is selected from the group consisting of silicone defoamer, polyether defoamer and mixtures thereof.

Addition of the defoamer in to the composition is to remove air in preparation of adhesive and to remove air bubbles in assembly on the display panels.

A photo-curable adhesive composition according present invention comprises the defoamer from 0.01% to 1% by weight of the total weight of the composition, preferably from 0.05% to 0.5%.

When the quantity of the defoamer is less than 0.01% by weight of the total weight of the composition, it tends to be difficult to remove the air from the composition during the preparation of the adhesive and difficult to remove the air bubbles during the assembly of the display panels. While quantity of the defoamer is higher than 1% by weight of the total weight of the composition, the composition tends to have haze problem, which will decrease the optical properties.

Other additives known to the skilled person may also be added into the composition according to the present invention with the provision the use of said additive(s) will not affect negatively to the performance of the composition.

As an example, antioxidant may also be added into the composition according to the present invention, and preferably, composition comprises antioxidant less than 1% by weight of the total weight of the composition.

As another example, UV absorber may also be added into the composition according to the present invention and preferably, composition comprises UV absorber less than 1% by weight of the total weight of the composition.

The photo-curable adhesive composition according to the present invention preferably has a thixotropic index (TI) from 2.0 to 7.0 and the variance of TI is less than 1.0 at temperatures from 2° C. to 50° C. Thixotropic index (TI) is defined as the ratio of viscosity at 1 $s^{-1}$ and viscosity at 10 $s^{-1}$. Ti stability can be defined as the change of TI with environment (2-8° C., 25° C. and 50° C.). The Ti at 2-8° C., 25° C. and 50° C. for different time (240 and 500 hours are tested.

The photo-curable adhesive composition according to the present invention preferably has viscosity is from 20,000 to 200,000 mPa.s at 25° C. under shearing rate of 1 $s^{-1}$ and preferably from 30,000 to 100,000 mPa.s. Viscosity is measured on TA DHR-2 Rheometer with cone plate. Measurement conditions are as follow: shearing rate scan is from 0.01 to 100 $s^{-1}$; testing temperature is 25° C.

The photo-curable adhesive composition according to the present invention includes particles with average particle size less than 10 μm preferably. Particle size is measured by BYK Grind Gage 50 μm. The measurement of the particle size is done as follows: an adhesive is placed on the side of BYK Grind Gage 50 μm with small size, and the adhesive is dispensed from one side to the other side (big size) with one squeegee. Finally, the particle size from BYK Grind Gage 50 μm is read by eyes.

The photo-curable adhesive composition according to the present invention preferably has side curing depth greater than 6 mm for display panel lamination. Side curing depth is the curing depth of adhesives when side curing equipment is used.

The curing depth is measured according to following procedure:

(i) Build the UV side curing light with appropriate wavelength and intensity using special fixture, and keep the distance between the light and the sample constant;

(ii) Wipe two pieces of ink glass (10.1 mm*25.4 mm*6 mm) with isopropyl alcohol or acetone, and put two spacers (254 µm) on one piece of the wiped glass near the two edges (24.5 mm side);

(iii) Dispense adhesive onto the glass and cover it with another piece of the wiped glass in the same size (make sure adhesive contact with ink side of glass), and subsequently fasten the assembly with two clamps (make sure that two pieces of glass overlap completely);

(iv) Place the assembled sample on the special fixer and cure it with UV light, and subsequently disassemble the two pieces of glass to see the curing depth, which is the side curing depth.

The photo-curable adhesive composition according to the present invention preferably has a hardness from Sh000 20 to Sh00 25 after curing for the application in display panel. The hardness is measured according to the test method ASTM D 2240.

The photo-curable adhesive composition according to the present invention preferably has transmittance more than 97% after curing for the application in display panel. The transmittance is measured according to the method ASTM E903.

The photo-curable adhesive composition according to the present invention preferably has b* value less than 2 after curing for the application in display panel. The b* value is measured according to the method ASTM E903.

The photo-curable adhesive composition according to present invention preferably has dielectric constant from 2.0 to 3.0 after curing for the application in display panel. Dielectric constant measurement is performed on LCR Meter E4980A.

The dielectric constant is measured according to following procedure:

(i) Cast a flat sheet, and cure as specified under the UV source; (ii) Cut 5 pieces of 12.9 $cm^2$ disks using a 12.9 $cm^2$ hole saw and smooth out the sample edges using sandpaper or a knife;

(ii) Perform the dielectric constant test on LCR Meter E4980A under different frequency of alternating-electric field.

By the term "reworkability" meant herein the ability to rework an optical assembly.

A process for reworking an optical assembly comprises following steps:

(i) The top substrate, preferably cover lens or touch panel, is detached from the display panel by heating the assembly preferably to about 50° C. to 100° C. and removing the top substrate;

(ii) After detaching the top substrate, the detached parts are cooled to room temperature (25° C.);

(iii) The residue adhesive film is peeled from the top substrate or the display panel.

The residue adhesive is observed by eyes.

The photo-curable adhesive composition according to present invention could be prepared in several ways of mixing all ingredients together.

In one embodiment, the preparation of photo-curable adhesive composition according present invention comprises following steps:

(i) preparing first pre-mix comprising a (meth)acrylate monomer, a photoinitiator, a chain transfer agent, first thixotropy agent, second thixotropy agent; and a defoamer, and grinding the pre-mixture to particles having average particle diameter less than10 µm;

(ii) preparing second pre-mix comprising a polyurethane acrylate and plasticizer.

(iii) combining first pre-mix and second pre-mix and mixing with shear blade.

In one preferred embodiment, the process comprises following steps:

(i) preparing first pre-mix comprising a (meth)acrylate monomer, a photoinitiator, a chain transfer agent, first thixotropy agent, second thixotropy agent ;and a defoamer with shear blade having the speed with 2000 rpm for about 30 min at 40° C., and grinding the pre-mixture to particles having average particle diameter less than 5 µm with tri-roll mill;

(ii) preparing second pre-mix comprising a polyurethane acrylate and plasticizer with shear blade having the speed with 2000 rpm for about 30 min at 40° C.

(iii) combining first pre-mix and second pre-mix and mixing with shear blade having the speed with 2000 rpm for about 30 min at 40° C.

The photo-curable adhesive composition according to the present invention can be used in bonding two transparent substrates together or in bonding one transparent substrate and one opaque substrate together. Preferably said transparent substrate is glass or plastic.

Furthermore, the present invention provides a process of making an optical assembly comprising steps of bonding two transparent substrates together or bonding one transparent substrate and one opaque substrate together using the photo-curable adhesive composition according to the present invention.

EXAMPLES

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples are considered as exemplary only, with a true scope and spirit of the invention being indicated by the claims.

TABLE ONE

Formulation of example 1 to 3 and comparative example 4

|  | Component | Example 1 | Example 2 | Example 3 | Comparative example 4 |
|---|---|---|---|---|---|
| a) Urethane acrylate oligomer | Urethane acrylate, CN 9014 NS from Sartomer | 16% | / | / | / |
|  | Urethane acrylate, UT-4462 from Nippon Gohsei | 42% | 42% | / | 42% |
|  | Urethane acrylate, UT-5141 from Nippon Gohsei | / | 18% | 20% | 18% |
| b) (Meth)acrylate monomer | Lauryl acrylate, SR335 from Sartomer | 8% | 8% | 9% | 8% |
|  | n-Octyl acrylate, NOAA from Osaka Organic Chemical | 14% | 14% | / | 14% |
|  | 4-Hydoxylbutyl acrylate, 4-HBA from Kyoeisha Chemical | 6.7% | 5% | / | 5% |
|  | Hydroxylethyl methacrylate, HEMA from Evonik | / | 1.7% | / | 1.7% |
|  | Isobornyl acrylate, IBOA Osaka Organic Chemical | / | / | 2% | / |
|  | Morpholine, 4-acryloyl-, ACMO from Kj Chemical | / | / | 1% | / |
|  | Hydroxylethyl acrylate, 2-HEA from Kowa American Corp. | / | / | 3% | / |
| c) Photo-initiator | 2,4,6-Trimethylbenzoyl-diphenyl-phosphineoxide, Genocure TPO from Rahn | 0.3% | 0.3% | 0.4% | 0.3% |
|  | Methanone,(1-hydroxycyclohexyl)phenyl-, Irgacure 184 from BASF | / | / | 1.8% | / |
| d) Plasticizer | 1,2-ethanediylbis(oxy-2,1-ethanediyl) 2-ethylhexanoate, Eastman TEG-EH plasticizer from Eastman | 6% | 5.2% | 5% | 5.2% |
|  | Polybutadiene, hydrogenated, hydroxylated, Krasol HLBH-P2000 from Cray Valley | / | / | 55.2% | / |
| e) Train transfer agent | 1,8-Dimercapto-3,5-dioxaoctane, DMDO from Arkema | 1.6% | 1.6% | / | / |
|  | Dodecyl mercaptan from Sinopharm | / | / | 0.3% | / |
| f) The first thixotropy agent | Trimethoxyoctylsilane hydrolysis products with silica, Aerosil R805 from Evonik | 5% | / | / | / |
|  | Hydophibic fumed silica, Aerosil 380 from Evonik | / | 5% | / | 5% |
|  | Hydophibic fumed silica, Aerosil 200 from Evonik | / | / | 2% | / |
| g) The second thixotropy agent | Polyhydroxycarboxylic acid esters, BYK R606 from BYK Chemical | 0.2% | 0.2% | / | 0.2% |
|  | Modified urea, BYK 411 from BYK Chemical | / | / | 0.1% | / |

TABLE ONE-continued

Formulation of example 1 to 3 and comparative example 4

| | Component | Example 1 | Example 2 | Example 3 | Comparative example 4 |
|---|---|---|---|---|---|
| h) Other additives | Solution of foam destroying polymers and polysiloxanes, BYK 088 from BYK Chemical | 0.2% | / | / | / |
| | Benzotriazol-2-yl)-4,6-di-tert-pentyl phenol *2-(2H-, Tinuvin 328 from BASF | / | / | 0.2% | / |

*The percentage of each component in table one is the weight ratio according to the total weight of the composition.

The composition in Examples 1 to 4 is prepared according to below process: (i) preparing first pre-mix comprising SR335, NOAA, 4-HBA, HEMA, Genocure TPO, DMDO, Aerosil 380, and BYK R606 in the mixer with shear blade having the speed with 2000 rpm for around 30 min under 40° C., and then grinding the pre-mixture to particles having average particle diameter less than 5 um with tri-roll mill; (ii) preparing second pre-mix comprising UT-5141, UT-4462 and Eastman TEG-EH plasticizer in the mixer with shear blade having the speed with 2000 rpm for around 30 min under 40° C.; (iii) combining first pre-mix and second pre-mix in the mixer and mixing with shear blade having the speed with 2000 rpm for around 30 min under 40° C.; (iv) deaerating the composition to remove bubble and filtrating with 10 um cartridge to get the final product.

TABLE TWO

Test results

| | Example | | | |
|---|---|---|---|---|
| Test | 1 | 2 | 3 | Comparative Example 4 |
| Thixotropic index (TI) | 4.2 | 5.4 | 3.5 | 5.3 |
| TI stability (Δ Ti) | <0.3 | <0.4 | <0.5 | <0.4 |
| Viscosity @1 s$^{-1}$ (mPa · s) | 96,000 | 87,000 | 31,000 | 86,000 |
| Particle size (um) | <10 | <10 | <10 | <10 |
| Side curing depth (mm) | 11.1 | 10.3 | 10.1 | 10.3 |
| Dielectric constant | 2.97 | 2.91 | 2.86 | 2.90 |
| Reworkability | no residue | no residue | no residue | no residue |
| Hardness of cured adhesive | Sh00 15 | Sh00 2 | Sh00 5 | Sh00 70 |
| Transmittance of cured adhesive | 99.2% | 99.3% | 98.5% | 99.5% |
| b* of cured adhesive | 0.1 | 0.15 | 0.08 | 0.2 |

As shown in Table two, the comparative example includes no chain transfer agent and it leads to a very high hardness after curing, i.e. Sh00 70 and as a result it could not be used for binding display panels.

And for the compositions of present invention, the test results demonstrated longer storage periods, workable during carrying out onto substrates. Furthermore, after curing they are able to simultaneously meet requirements of high transmittance, low yellowness degree, good reworkability, proper dielectric capacity and mechanic properties etc.

What is claimed is:

1. A photo-curable adhesive composition comprising
   a) at least one polyurethane acrylate having a Tg value from −70 to 20° C.;
   b) at least one (meth)acrylate monomer;
   c) at least one thiol chain transfer agent present in an amount of 0.1% by weight to 3% by weight of the total composition;
   d) at least two thixotropy agents, wherein a first thixotropy agent is selected from the group consisting of hydrophobic fumed silica, hydrophilic fumed silica and mixtures thereof and is present in an amount of about 0.01% by weight to about 10% by weight of the total composition, and a second thixotropy agent is selected from the group consisting of modified urea, polyhydroxycarboxylic acid esters and mixtures thereof and is present in an amount of about 0.01% by weight to about 5% by weight of the total composition;
   e) at least one photoinitiator;
   f) at least one plasticizer; and
   g) at least one defoamer selected from the group consisting of silicone defoamers, polyether defoamers and mineral oil defoamers and mixtures thereof.

2. The composition according to claim 1, wherein said polyurethane acrylate is an aliphatic polyether urethane or acrylic ester.

3. The composition according to claim 1, wherein said (meth)acrylate monomer is a mono-functional or di-functional (meth)acrylate monomer.

4. The composition according to claim 1, wherein said thiol chain transfer agent is selected from the group consisting of n-octyl mercaptan, n-dodecyl mercaptan, tertiary-dodecyl mercaptan, methyl mercaptan, ethyl mercaptan, tertio-butyl mercaptan, benzyl mercaptan, tertio-nonyl mercaptan, thioglycolic, iso-octyl thioglycolate, 2-ethylhexyl thioglycolate, 1,8-dimercapto-3,5-dioxaoctane, dibenzylthithiocarbonate, β-mercaptopropionic, methyl 3-mercaptopropionate, 2-ethylhexyl-3-mercaptopropionate, n-octyl-3-mercaptopropioate, methoxybuthyl-3-mercaptopropionate, stearyl-3-mercaptopropionate, 8-dimercapto-3,6-dioxaoctane, trimethylolpropane tris-3-mercaptopropionate, tris [(3-mercaptopropionyloxy)-ethyl]-isocyanurate, pentaerythritol tetrakis-3-mercaptopropionate, tetraethyleneglycol bis(3-mercaptopropionate), dipentaerythritol hexa-3-mercaptopropionate and mixtures thereof.

5. The composition according to claim 1, wherein said photoinitiator is selected from the group consisting of 1-hydroxy cyclohexyl phenyl ketone, 2-methyl-1-[4-(methylthio)phenyl]-2-morpholino propan-1-one, 2-benzyl-1-N,N-dimethylamino-1-(4-morpholinophenyl)-1-butanone, combination of 1-hydroxy cyclohexyl phenyl ketone and benzophenone, 2,2-dimethoxy-2-phenyl acetophenone, combination of bis(2,6-dimethoxybenzoyl-2,4,6-trimethyl-pentyl) phosphine oxide and 2-hydroxyl-2-methyl-1-phenyl-propan-1-one, bis(2,4,6-trimethyl benzoyl) phenyl phosphine oxide, 2-hydroxy-2-methyl-1-phenyl-1-propane, combination of 2,4,6-trimethylbenzoyl diphenyl phosphine oxide and 2-hydroxy-2-methyl-l-phenyl-propan-1-one, 2,4,6-trimethylbenzoyldiphenylphosphine oxide and mixtures thereof.

6. The composition according to claim 1, wherein said plasticizer is selected from the group consisting of polyisoprene resin, polybutadiene resin, hydrogenated polybutadiene, xylene polymer, hydroxyl-terminated polybutadiene and/or hydroxyl-terminated polyolefin, triethylene glycol bis(2-ethylhexanoate), dibutoxyethoxyethyl adipate, and mixtures thereof.

7. The composition according to claim 1, comprises said polyurethane acrylate from 10% to 90% by weight of the total weight of the composition.

8. The composition according to claim 1, comprises said (meth)acrylate monomer from 5% to 40% by weight of the total weight of the composition.

9. The composition according to claim 1, comprises said photo-initiator from 0.02% to 5% by weight of the total weight of the composition.

10. The composition according to claim 1, comprises said plasticizer from 0.1% to 80% by weight of the total weight of the composition.

11. The composition according to claim 1, comprises said defoamer from 0.01% to 1.0% by weight of the total weight of the composition.

12. A process to prepare a composition according to claim 1, comprising steps of:
  (i) preparing first pre-mix comprising a (meth)acrylate monomer, a photoinitiator, a chain transfer agent, first thixotropy agent, second thixotropy agent and a defoamer, and grinding the pre-mixture to particles having average particle diameter between 5 to 10 μm;
  (ii) preparing second pre-mix comprising a polyurethane acrylate and plasticizer;
  (iii) combining first pre-mix and second pre-mix and mixing with shear blade.

13. A process comprising steps of bonding two transparent substrates together or bonding one transparent substrate and one opaque substrate together using the composition according to claim 1.

14. The process according to claim 13, wherein the said transparent substrate is glass or plastic.

15. A process of making an optical assembly comprising steps of bonding two transparent substrates together or bonding one transparent substrate and one opaque substrate together using the composition according to claim 1.

16. The composition according to claim 1, wherein said (meth)acrylate monomer is selected from the group consisting of methyl (meth)acrylate, ethyl (meth)acrylate, butyl (meth)acrylate, 2-(2-ethoxyethoxy) ethyl acrylate, tetrahydrofurfuryl (meth)acrylate, lauryl actylate, isooctyl acrylate, n-octyl acrylate, isodecyl acrylate, n-decyl acrylate, 2-phenoxythyl acrylate, isobornyl acrylate, 2-hydroxyethyl (meth) acrylate, 2-hydroxypropyl (meth)acrylate, 2(or 4)-hydroxybutyl (meth)acrylate, caprolactone acrylate, morpholine (meth)acrylate, morpholine, 4-acryloyl-, hexanediol di(meth)acrylate, ethyleneglycol di(meth)acrylate and mixtures thereof.

\* \* \* \* \*